United States Patent Office 3,080,415
Patented Mar. 5, 1963

3,080,415
NEW DERIVATIVES OF 2-ARYL-ETHANOIC ACIDS AND A PROCESS FOR THE PRODUCTION THEREOF
Ernst Habicht, Schaffhausen, Switzerland, assignor to Cilag-Chemie Limited, Schaffhausen, Switzerland, a Swiss company
No Drawing. Filed June 10, 1960, Ser. No. 35,146
Claims priority, application Switzerland June 15, 1959
8 Claims. (Cl. 260—470)

The present invention relates to new derivatives of 2-aryl-ethanoic acids and a process for the production thereof.

Scope of the invention is to provide for new derivatives of 2-aryl-2-aminoalkylmercapto-ethanoic acids with valuable pharmaceutical properties.

The present invention relates particularly to derivatives of 2-aryl-2-aminoalkylmercapto-ethanoic acids of the general formula

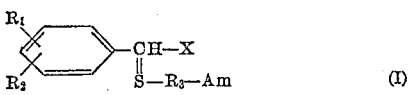
(I)

wherein $R_1$ and $R_2$ represent hydrogen, halogen, particularly chlorine or bromine, alkyl, alkoxy, alkylmercapto or together methylenedioxy, whereby the alkyl radicals in $R_1$ and $R_2$ shall contain together not more than 4 carbon atoms, and wherein $R_3$ represents a straight or branched alkylene containing from 2 to 4 carbon atoms in straight chain, and Am represents a secondary or tertiary amino group, particularly a lower monoalkylamino, dialkylamino, pyrolidino, piperidino, morpholino and N'-alkylpiperazino group, whereas the symbol X represents one of the following groupings:

(a)      —COOR

[Hereinafter called "esters"]

wherein R represents an aliphatic, araliphatic or cycloaliphatic radical such as for instance alkyl, alkenyl, alkanedienyl, alkynyl, alkanediynyl, cycloalkyl, cycloalkylalkyl, aralkyl, whereby R shall contain not more than 12, preferably not more than 8 carbon atoms;

(b)      —CH₂—O—R'

[Hereinafter called "ethanols" and "ethanol esters"]

wherein R' represents hydrogen or an acyl radical of aliphatic, araliphatic, aromatic or heterocyclic nature, or represents an unsubstituted or a N-monoalkylated carbaminyl radical, whereby R' shall contain not more than 12, preferably not more than 8 carbon atoms;

(c) 

[Hereinafter called "amides"]

wherein R represents hydrogen or has the same meaning as given under par. (a) hereabove.

The present invention thus relates to esters and amides of 2-aryl-2-sec.- and -tert.aminoalkylmercapto-ethanoic acids and to 2-aryl-2-sec.- and -tert.aminoalkylmercapto-1-ethanols and to esters of such ethanols with aliphatic, araliphatic and aromatic carboxylic acids or with carbamic acids.

The present invention likewise relates to the acid addition salts of the new 2-aryl-ethanoic acids and 2-aryl ethanols of the Formula I and to the quaternary salts as well as to the sulfoxides of such compounds, whereby the anion of such salts shall be physiologically compatible, i.e. it shall be indifferent.

The new derivatives of the Formula I and their acid addition salts and their quaternary salts as well as their sulfoxides have a strong spasmolytic effect, act sedatively and analgetically, and can, depending on their constitution, be used as tranquilizers or psychoenergizers.

It was also found that the esters and amides of such 2-aryl-ethanoic acids as well as the respective ethanols and esters thereof have an anti-inflammatory effect. In combination with the analgetic properties inherent in them they represent valuable remedies in the treatment of rheumatic and arthritic troubles.

It is to be stressed here that regarding the constitution no strict coincidence between analgetic and anti-inflammatory activity could be found.

For instance esters of 2-aryl-2-tert.aminoalkylmercapto-ethanoic acids of the formula

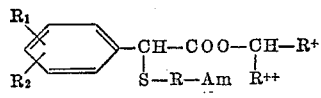

wherein R+ represents $CH_3$, $C_2H_5$, $C_3H_7$, $C_4H_9$, $C_5H_{11}$, and R++ represents H, $CH_3$, $C_2H_5$, have a pronounced analgetic activity, whereas compounds with a strong anti-inflammatory effect are to be found also among the alcohols of the formula

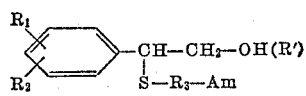

and among their esters.

Again, among the esters of these alcohols are found analgetically highly effective substances when R' represents acetyl, phenacetyl, benzoyl, acroyl, dimethyl acroyl, whereas the propionates and the butyrates have a pronounced anti-inflammatory effect.

The esters and amides of the 2-aryl-2-sec.- and -tert.aminoalkylmercapto-ethanoic acids are easy to prepare. The most favorable process for their production consists of reacting an ester or an amide of a 2-halogeno-2-aryl-ethanoic acid of the formula

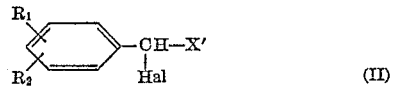
(II)

wherein X' is —COOR or

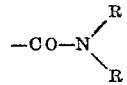

and Hal is chlorine or bromine with a compound of the formula

HS—R₃—Am      (III)

When reacting for instance an ester of a 2-aryl-2-halogeno-ethanoic acid of the Formula II with an aminoalkanethiol of the Formula III, it is not necessary to use a condensing agent, as the two reactants II and III can simply be given together in a solvent, for instance in a lower nitrile such as acetonitrile, this leading with self-heating and with splitting off of the hydrohalide directly to the hydrohalide of the compound desired. As a rule, the reaction is terminated within approximately 1 hour without outer heat supply. Apart from lower nitriles it is likewise possible to use halogenized benzenes, such as for instance chlorobenzene, m- or o-dichlorobenzene, etc.; however, the condensation must then be brought to an end by heating. It is also possible to use an alcohol as solvent, whereby it is of advantage to add an alkaline condensing agent, such as for instance an alkalialkoxide.

When reacting an amide of a 2-phenyl-2-chloro- or -2-bromo-ethanoic acid with a thiol of the Formula III, there is preferably chosen a lower nitrile as solvent, for instance acetonitrile. However, in this case the reaction proceeds more inertly than when using the corresponding esters and has as a rule to be brought to an end by reflux heating lasting several hours.

In the group

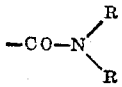

the radical

can as mentioned hereinbefore have the following meanings: unsubstituted amino, monoalkylamino, dialkylamino, aralkylamino, diaralkylamino, cycloalkylamino, dicycloalkylamino, as well as the following means: pyrrolidino, piperidino, morpholino and N'-alkyl-piperazino. The radical

shall contain not more than 12 carbon atoms.

In accordance with the methods described hereinbefore it is for instance possible to react ethyl-, propyl-, isopropyl-, butyl-, amyl-, methoxyethyl-, ethoxyethyl-, methylthioethyl-, dimethylaminoethyl-, diethylaminoethyl-, allyl-, crotyl-2-phenyl-2-chloroethanoate, or the amide, methylamide, ethylamide, dimethylamide, diethylamide pyrrolidide, piperidide, propylamide, butylamide, di-propylamide, di-butylamide, benzylamide, p-methoxybenzylamide, 3,4-dimethoxybenzylamide of 2-phenyl-2-chloro-ethanoic acid, etc. with dimethylaminoethanethiol, diethylaminoethanethiol, dipropylaminoethanethiol, pyrrolidinoethanethiol, piperidinoethanethiol, morpholinoethanethiol, 2-(2',5'-dimethylpyrrolidino)-ethanethiol, 3 - dimethylaminopropanethiol, 3 - diethylaminopropanethiol, 3 - pyrrolidinopropanethiol, 3 - piperidinopropanethiol, 2-(2',6'-dimethylpiperidino)-ethanethiol, 2-(2',4', 6'-trimethylpiperidino)-ethanethiol, 3-(2',5'-dimethylpyrrolidino)-propanethiol, 3-morpholinopropanethiol, etc.

Instead of an ester of a 2-phenyl-2-halogeno-ethanoic acid or of an appropriate amide unsubstituted in the phenyl it is likewise possible to use the esters and the amides of the following 2-aryl-2-halogeno-ethanoic acids: p-chloro- or p-bromophenyl-ethanoic acid, p-methoxy- or p-ethoxyphenyl-ethanoic acid, 2,4-dimethoxy- or 2,4-diethoxyphenyl-ethanoic acid, 3-methoxy- or 3-ethoxyphenyl-ethanoic acid, 3,4-dimethoxy- or 3,4-diethoxyphenyl-ethanoic acid, 3,4 - methylenedioxy-phenyl-ethanoic acid, 3,4-dimethyl- or 3,4-diethyl-phenyl-ethanoic acid, and other similarly built 2-aryl-ethanoic acids.

The 2-aryl-2-sec.- and -tert.-aminoalkylmercapto-1-ethanols are preferably produced in the following manner:

A lower alkyl ester of a 2-aryl-2-aminoalkylmercapto-ethanoic acid, such as for instance the methyl or the ethyl ester, is reduced by means of reducing agents usual for such cases, such as for instance LiAlH$_4$ or NaBH$_4$ or sodium in butanol. As solvent is used: ether, dioxane or tetrahydrofuran.

The resulting ethanols represent partly solid bodies at room temperature, and partly liquid bodies. As a rule they are soluble in water with alkaline reaction. The salts with acids are soluble in water with nearly neutral reaction and permit ready parenteral application.

If so desired, the resulting ethanols can be converted into their acyl derivatives, for instance by means of paraffin-carboxylic acid, halogenides or paraffin-carboxylic acid anhydrides, whereby under paraffin-carboxylic acids shall preferably be understood acetic acid, propionic acid, butyric acid, iso-butyric acid, pivalinic acid, crotonic acid, dimethyl-crotonic acid, etc.

However, it is likewise possible to acylate by means or araliphatic acids, such as for instance phenyl-acetic acid or 2-phenyl-3-methyl pentanoic acid, or with aromatic acids, such as for instance benzoic acid, 2,4-dimethyl-benzoic acid, 2,6-dimethyl-benzoic acid, 3,4,5-trimethoxy-benzoic acid, their halogenides or their anhydrides. It is furthermore possible to acylate with heterocyclic acids, such as for instance picolinic acid, nicotinic acid, iso-nicotinic acid, or with the hydrogenated derivatives thereof, or with their esters, halogenides, anhydrides, obtaining thereby derivatives which are partly analgetically, partly antiphlogistically effective.

When using as acylating medium an acid anhydride, the condensing agent to be chosen should preferably be pyridine.

When acylating one of the aforementioned ethanols by means of an acid chloride or an acid bromide there is preferably chosen as condensing agent a lower tertiary aliphatic amine, such as for instance triethylamine, ethyl-di-isopropylamine, etc.

It is possible to work without solvent when acylating, particularly if the acylating agent, i.e. the acid anhydride or the acid chloride, is liquid. However, cleaner results are obtained when softening the process of the acylation by means of a solvent, for instance by ether, dioxane or benzene.

The resulting ethanols can, if so desired, be converted into their carbamates. The methods of the conversion into carbamates are known. One preferably proceeds in such manner as to allow an ethanol of the formula

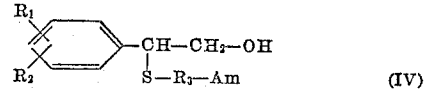

a reactive derivative of carbonic acid and ammonia to act on one another. It is thus possible to react an ethanol of the Formula IV first with phosgene and further reacting the resulting chloro-carbonic acid ester with NH$_3$ or a monoalkylamine. However, it is also possible to react NH$_3$ or an amine first with phosgene or a halogeno-carbonic acid ester and to further react the resulting carbamic acid halide or the resulting carbamic acid ester with an ethanol of the Formula IV. It is likewise possible to react a respective isocyanate in the place of a carbamic acid ester or halogenide.

The new esters and amides of 2-aryl-2-aminoalkylmercapto-ethanoic acids as well as the corresponding ethanols of the Formula I can be converted into a quaternary salt. For the quaternisation can be used: lower alkylhalogenides, such as for instance methylbromide, methyliodide, ethylbromide, ethyliodide, allylbromide or allyliodide, crotyl bromide; or lower dialkylsulfates, such as for instance dimethylsulfate or diethylsulfate; or lower alkylesters of alkane-sulfonic acids, such as for instance methyl methanesulfonate, ethyl methanesulfonate; or esters of araliphatic alcohols, such as for instance benzylchloride, benzylbromide or phenethylbromide. It is essential that the anion of the quaternary salt be physiologically indifferent.

The conversion of the esters and amides into their sulfoxides is accomplished in accordance with known methods, for instance by means of hydrogen peroxide in a cold mixture of glacial acetic acid and acetic acid anhydride.

When desiring to isolate the resulting esters and amides of the 2-aryl-2-aminoalkylmercapto-ethanoic acids in form of their acid addition salts, the following acids can for instance be used: inorganic acids, such as sulfuric acid, hydrochloric acid, hydrobromic acid, phosphoric acid; or organic acids, such as for instance acetic acid, glycolic acid, citric acid, succinic acid, fumaric acid, maleinic acid, di-hydroxy maleinic acid, methane-sulfonic acid, ethane-sulfonic acid, hydroxyethane-sulfonic acid, and others.

As a rule, the citrates of the esters and of the amides of the 2-aryl-2-aminoalkylmercapto-ethanoic acids and of the corresponding ethanols and ethanol esters crystallise very well. They are obtained as dihydrogencitrates in anhydrous form and can in this form be conserved without difficulties. They are usually prepared in acetone as solvent. They precipitate automatically or are precipitated as crystals by addition of ether.

*Example 1*

A solution of 23 g. of dimethylaminoethanethiol in 50 cc. of acetonitrile is given dropwise into a solution of 50 g. of ethyl 2-phenyl-2-bromoethan-1-oate in 100 cc. of acetonitrile. The whole is stirred vigorously, and the temperature rises automatically within 5 minutes to 50° C. After one hour the whole is set aside and after a few hours' standing it is treated with 100 cc. of 1 N glycolic acid. The acetonitrile and the water are distilled off in vacuo, the residue is taken up in 100 cc. of 2 N glycolic acid, and the acid aqueous solution is washed with ether and then rendered alkaline. The separating oil is taken up in ether, the ether dried over $K_2CO_3$ and then evaporated. The residue is distilled under high vacuum. There are obtained 42–43 g. of ethyl 2-phenyl-2-(2'-dimethylaminoethylmercapto)-ethan-1-oate. The new ester boils under 0.01 mm. at 118–119° C.

*Dihdrogencitrate.*—10 g. of the ester as obtained above are dissolved in 35 cc. of acetone. To this solution are added 7.3 g. of citric acid, the whole heated briefly and then filtered. By adding ether, colorless crystals are obtained, which can be recrystallised from acetone/absolute ether. The resulting dihydrogencitrate melts at 82–83° C.

*N-methylmethosulfate.*—To a solution of 15 g. of the resulting ester in 50 cc. of absolute ether is given a solution of 7.2 g. of dimethyl sulfate in 50 cc. of absolute ether. There results almost immediately turbidity with self-heating. After 5 minutes a thick crystal slurry is formed. The whole is again diluted with 100 cc. of ether, set aside for 24 hours, and the crystals are then filtered off with suction. The crystals are recrystallised from a mixture of 160 cc. of absolute ethanol and 120 cc. of absolute ether. There are obtained 14.3 g. of the N-methylmethosulfate, which melts at 168–169° C. The new salt is readily soluble in cold water and fairly well soluble in methanol and ethanol.

In the same manner are obtained the methobromide and the methoiodide.

*Example 2*

In a manner analogous to that described in Example 1 there are obtained by giving together 100 g. of ethyl 2-phenyl-2-bromoethan-1-oate in 150 cc. of acetonitrile and 58.4 g. of diethylaminoethanethiol in 100 cc. of acetonitrile and after working up 110 g. of ethyl 2-phenyl-2-(2'-diethylaminoethylmercapto)-ethan-1-oate, which boils under 0.05 mm. at 146° C. or under 0.03 mm. at 135–137° C. The new compound is readily soluble in organic solvents as well as in dilute acids, but is little soluble in water with alkaline reaction. The dihydrogencitrate of the ester melts at 87–89° C. after having been recrystallised from acetone/ether. The salt is readily soluble in water and in methanol. The N-methylmethosulfate forms colorless crystals, which melt at 98–99° C. after having been recrystallised from acetone/ether. The crystals are readily soluble in methanol and water.

In the same manner are obtained:
Ethyl 2-phenyl-2-(3'-diethylaminopropylmercapto)-ethan-1-oate; B.P. 0.01 mm., 158–161° C.;
Ethyl 2-phenyl-2-(3'-piperidinopropylmercapto)-ethan-1-oate; B.P. 0.03 mm., 167–169° C.

*Example 3*

When reacting in a manner analogous to that described in the aforegoing Examples 23.9 g. of n-propyl-2-phenyl-2-chloroethan-1-oate in 50 cc. of acetonitrile with 12 g. of dimethylaminoethanethiol in 40 cc. of acetonitrile, there are obtained 27 g. of n-propyl 2-phenyl-2-(2'-dimethylaminoethylmercapto)-ethan-1-oate. The new ester boils under 0.01 mm. at 120–121° C. and is readily soluble in dilute acids. The dihydrogencitrate of the ester melts at 70–71° C., the N-methylmethosulfate at 183° C. Both salts are readily soluble in water.

*Example 4*

From 21.3 g. of n-propyl-2-phenyl-2-chloroethan-1-oate in 50 cc. of acetonitrile and 13.4 g. of diethylaminoethanethiol in 40 cc. of acetonitrile are obtained 26 g. of n-propyl 2-phenyl-2-(2'-diethylaminoethylmercapto)-ethan-1-oate. The new ester boils under 0.02 mm. at 132–133° C., forms a dihydrogencitrate melting at 88–90° C., and a N-methylmethosulfate melting at 114–115° C.

*Example 5*

When reacting 23.3 g. of isopropyl 2-phenyl-2-chloroethan-1-oate in 50 cc. of acetonitrile with 11.6 g. of dimethylaminoethanethiol in 40 cc. of acetonitrile and working up in a manner analogous to that described in the aforegoing examples, 25 g. of isopropyl 2-phenyl-2-(2'-dimethylaminoethylmercapto)-ethan-1-oate are obtained. The new ester boils under 0.015 mm. at 119–121° C.; its dihydrogencitrate melts at 77–79° C. and its N-methylmethosulfate at 177–179° C.

*Example 6*

The reaction of 20 g. of isopropyl 2-phenyl-2-chloroethan-1-oate in 50 cc. of acetonitrile with 12.6 g. of diethylaminoethanethiol in 40 cc. of acetonitrile yields 25 g. of isopropyl 2-phenyl-2-(2'-diethylaminoethylmercapto)-ethan-1-oate, which boils under 0.01 mm. at 125–126° C. Its dihydrogencitrate melts at 100–101° C. and its N-methylmethosulfate at 94–96° C.

In the same manner can be obtained:
Isopropyl 2-phenyl-2-(2'-piperidinoethylmercapto)-ethan-1-oate; B.P. 0.01 mm., 147–149° C.;
Isopropyl 2-phenyl-2-(di-isopropylaminoethylmercapto)-ethan-1-oate; B.P. 0.07 mm., 137–138° C.;
Isopropyl 2-phenyl-2-(2'-pyrrolidinoethylmercapto)-ethan-1-oate; B.P. 0.03 mm., 142–143° C.

*Example 7*

When reacting 59 g. of 2-phenyl-2-bromo-ethanoic acid-1-chloride with 30 g. of n-butanol in the presence of 32.5 g. of ethyl-di-isopropylamine in 250 cc. of dioxane at 20–25° C., there are obtained 55 g. of n-butyl 2-phenyl-2-bromoethan-1-oate, which boils under 0.015 mm. at 102–105° C. By further reacting 27 g. of n-butyl 2-phenyl-2-bromoethan-1-oate with 10.5 g. of dimethylaminoethanethiol in 100 cc. of acetonitrile, there are obtained 22 g. of n-butyl 2-phenyl-2-(2'-dimethylaminoethylmercapto)-ethan-1-oate. The new ester boils under 0.02 mm. at 145–147° C., and forms a dihydrogencitrate melting at 71–72° C. and a N-methylmethosulfate melting at 156–157° C.

*Example 8*

From 27.4 g. of n-butyl 2-phenyl-2-bromoethan-1-oate and 13.5 g. of diethylaminoethanethiol in 100 cc. of acetonitrile are obtained 26 g. of n-butyl 2-phenyl-2-(2'-diethylaminoethylmercapto)-ethan-1-oate, which boils under 0.02 mm. at 140–141° C. The dihydrogencitrate of the new ester melts at 89–90° C. and the N-methylmethosulfate melts at 118–119° C.

In analogous manner are obtained:
n-Butyl 2-p-chlorophenyl-2-(2'-diethylaminoethylmercapto)-ethan-1-oate; B.P. 0.01 mm., 143–145° C.;
n-Butyl 2-p-ethoxyphenyl-2-(2'-diethylaminoethylmercapto)-ethan-1-oate; B.P. 0.05 mm., 156–158° C.;
n-Butyl 2-m-p-methylenedioxyphenyl-2-(2'-diethylaminoethylmercapto)-ethan-1-oate; B.P. 0.02 mm., 160–162° C.

Example 9

The reaction of 47.3 g. of 2-phenyl-2-chloroethanoic acid-1-chloride with 30 g. of isobutanol in the presence of 32.5 g. of ethyl-diisopropylamine in 250 cc. of dioxane at 25–30° C. leads to the isobutyl 2-phenyl-2-chloroethan-1-oate, which boils under 0.02 mm. at 84–86° C.

When reacting in the usual manner 24.7 g. of the thus resulting ester with 11.6 g. of dimethylaminoethanethiol in 100 cc. of acetonitrile, there are obtained 19 g. of the isobutyl 2-phenyl - 2 - (2'-dimethylaminoethylmercapto)-ethan-1-oate, which boils under 0.05 mm. at 131–132° C. The dihydrogencitrate of the new ester melts at 78–80° C., the N-methylmethosulfate of the new ester melts at 170–172° C.

Example 10

From 20 g. of isobutyl 2-chloro-2-phenyl-ethan-1-oate and 12 g. of diethylaminoethanethiol in 90 cc. of acetonitrile are obtained 27.3 g. of isobutyl 2-phenyl-2-(2'-diethylaminoethylmercapto)-ethan-1-oate. The new ester boils under 0.04 mm. at 148–150° C. Its dihydrogencitrate melts at 94–95° C., its N-methylmethosulfate at 106–108° C.

Example 11

When reacting 47.3 g. of 2-phenyl 2-chloro-ethanoic acid-1-chloride with 30 g. of sec.butanol in the presence of 32.5 g. of ethyl-diisopropylamine in 250 cc. of absolute dioxane there are obtained 45 g. of sec.butyl 2-phenyl-2-chloroethan-1-oate boiling under 0.02 mm. at 82–84° C. From 24.7 g. of the resulting ester and 11.6 g. of dimethylaminoethanethiol in 100 cc. of acetonitrile are obtained 25.2 g. of sec.butyl 2-phenyl-2-(2'-dimethylaminoethylmercapto)-ethan-1-oate boiling under 0.01 mm. at 127–129° C. The new ester forms a dihydrogencitrate melting at 85–86° C. and a N-methylmethosulfate melting at 165–166° C.

Example 12

From 20 g. of sec.butyl 2-phenyl-2-chloroethan-1-oate and 11.8 g. of diethylaminoethanethiol in 80 cc. of acetonitrile are obtained 21 g. of sec.butyl 2-phenyl-2-(2'-diethylaminoethylmercapto) - ethan - 1 - oate, which boils under 0.06 mm. at 133–134° C. The dihydrogencitrate of the new ester melts at 97–98° C. and the N-methylmethosulfate thereof melts at 81–83° C. Both salts are readily soluble in methanol and water.

In the same manner can be obtained:
Sec.butyl 2-phenyl - 2 - (2'-piperidinoethylmercapto)-ethan-1-oate; B.P. 0.02 mm., 141–142° C.
Sec.butyl 2-phenyl-2-(2'-N'-methylpiperazinoethylmercapto)-ethan-1-oate; B.P. 0.01 mm., 159–161° C.

Example 13

25.4 g. of n-amyl 2-phenyl-2-chloroethan-1-oate (produced from the appropriate acid chloride and n-amyl alcohol; B.P. 12 mm., 164° C.) and 11.2 g. of dimethylaminoethanethiol are reacted in the usual manner in 120 cc. of acetonitrile. Subsequent to working up 28 g. of n-amyl 2 - phenyl - 2 - (2'-dimethylaminoethylmercapto)-ethan-1-oate are obtained. The new ester boils under 0.01 mm. at 140–141° C. The dihydrogencitrate of the new ester melts at 70–72° C. and the N-methylmethosulfate at 121–123° C. Both salts are readily soluble in water.

Example 14

By reacting 25 g. of n-amyl 2-phenyl-2-chloroethan-1-oate with 13.9 g. of diethylaminoethanethiol in 120 cc. of acetonitrile are obtained 31.2 g. of n-amyl 2-phenyl-2-(2'-diethylaminoethylmercapto)-ethan - 1 - oate. The new ester boils under 0.01 mm. at 150–155° C. Its dihydrogencitrate melts at 78–79° C. and its N-methylmethosulfate at 83–84° C.

In the same manner is obtained:
n-Amyl 2 - phenyl - 2 - (2'-piperidinoethylmercapto)-ethan-1-oate; B.P. 0.02 mm., 165–166° C.

Example 15

From the 30 g. of isoamyl 2-phenyl-2-bromoethan-1-oate and 12.1 g. of dimethylaminoethanethiol in 120 cc. of acetonitrile are obtained 25.4 g. of the isoamyl 2-phenyl - 2 - (2'-dimethylaminoethylmercapto)-ethan-1-oate. The new ester boils under 0.05 mm. at 158–162° C. It forms a dihydrogencitrate melting at 83–85° C. and a N-methylmethosulfate melting at 144–145° C.

Example 16

The reaction of 31.2 g. of isoamyl 2-phenyl-2-bromoethan-1-oate with 14.7 g. of diethylaminoethanethiol yields 27.8 g. of isoamyl 2-phenyl-2-(2'-diethylaminoethylmercapto)-ethan-1-oate, which boils under 0.01 mm. at 146–149° C. The dihydrogencitrate of the new ester melts at 87–88° C., the N-methylmethosulfate at 116–117° C.

Example 17

27 g. of neopentyl 2-phenyl-2-chloroethan-1-oate (B.P. 0.006 mm., 78–79° C.) are reacted in the usual manner with 12 g. of dimethylaminoethanethiol in 90 cc. of acetonitrile. There result 29.9 g. of neopentyl 2-phenyl-2-(2'-dimethylaminoethylmercapto)-ethan - 1 - oate boiling under 0.01 mm. at 124–126° C. Its dihydrogencitrate melts at 85–87° C., and the N-methylmethosulfate melts at 150–152° C.

Example 18

From 27 g. of neopentyl 2-phenyl-2-chloroethan-1-oate and 15 g. of diethylaminoethanethiol in 90 cc. of acetonitrile are obtained 31.9 g. of neopentyl 2-phenyl-2-(2'-diethylaminoethylmercapto)-ethan - 1 - oate, which boils under 0.01 mm. at 134–137° C. Its dihydrogencitrate melts at 88–89° C., its N-methylmethosulfate melts at 112–113° C.

Example 19

24.2 g. of (3'-methyl-butyl-2')-2-phenyl-2-chloroethan-1-oate are reacted in the usual manner with 10.7 g. of dimethylaminoethanethiol in 90 cc. of acetonitrile. Subsequent to working up and distilling, 27.1 g. of the (3''-methyl-butyl-2'') - 2 - phenyl-2-(2'-dimethylaminoethylmercapto)-ethan-1-oate of the formula

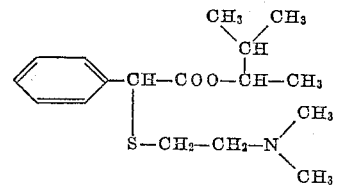

are obtained. The new ester boils under 0.008 mm. at 125–127° C. Its dihydrogencitrate melts at 83–84° C., and its N-methylmethosulfate melts at 155–157° C.

Example 20

27 g. of (3'-methyl-butyl-2')-2-phenyl-2-chloroethan-1-oate are reacted with 15 g. of diethylaminoethanethiol in 90 cc. of acetonitrile. Subsequent to working up, which is carried out in the usual manner, 32.6 g. of (3'' - methyl - butyl - 2'') - 2 - phenyl - 2 - (2' - diethylaminoethylmercapto)-ethan - 1 - oate are obtained. The new ester boils under 0.007 mm. at 139–142° C. It forms with the usual inorganic and organic acids readily soluble salts. Its dihydrogencitrate melts at 88–91° C., its N-methylmethosulfate at 86–88° C.

Example 21

24.4 g. of (4'-methyl-pentyl-2')-2-phenyl-2-bromoethan-1-oate and 60 cc. of acetonitrile are given into a stirring device. To this solution are added dropwise 8.7 g. of dimethylaminoethanethiol in 40 cc. of acetonitrile.

The reaction proceeds under rise in temperature. After 1 hour's turbinating the hydrobromide of the resulting compound crystallises out. Regardless of that, there follows treatment with 100 cc. of 1 N glycolic acid and working up as indicated in Example 1. There are obtained 16 g. of (4''-methyl-pentyl-2'')-2-phenyl-2-(2'-dimethylaminoethylmercapto)-ethan-1-oate of the formula

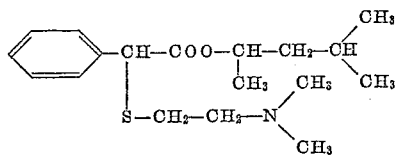

which boils under 0.015 mm. at 137–140° C. The dihydrogencitrate of the new ester melts at 71–73° C., the N-methylmethosulfate at 106–107° C.

*Example 22*

32.4 g. of (4'-methyl-pentyl-2')-2-phenyl-2-chloroethan-1-oate are reacted in the usual manner with 17.3 g. of diethylaminoethanethiol in 125 cc. of acetonitrile. Subsequent to the usual working up there are obtained 38.6 g. of (4''-methyl-pentyl-2'')-2-phenyl-2-(2'-diethylaminoethylmercapto)-ethan-1-oate, which boils under 0.01 mm. at 143–147° C. The new ester forms a slightly yellow colored fluid oil, which can be mixed with the usual organic solvents, but not with water. The acetate of the new ester is readily soluble, the hydrochloride relatively little soluble in water. The dihydrogencitrate of the new ester melts at 78–79° C., the N-methylmethosulfate at 93° C.; both salts are readily soluble.

*Example 23*

20.5 g. of allyl 2-phenyl-2-chloroethan-1-oate (produced from the appropriate acid chloride and allylalcohol; B.P. 12 mm., 141–144° C.) are given into a stirring device with 50 cc. of acetonitrile. To this solution is added dropwise a solution of 10.5 g. of dimethylaminoethanethiol in 40 cc. of acetonitrile. The temperature rises automatically to 42° C. When the reaction subsides, the whole is left standing for 2 hours and then worked up in the usual manner. 24 g. of allyl 2-phenyl-2-(2'-dimethylaminoethylmercapto)-ethan-1-oate are obtained. The new ester boils under 0.1 mm. at 135–137° C. The hydrochloride of the new ester is readily soluble in water, as are also the dihydrogencitrate which melts at 67–69° C. and the N-methylmethosulfate which melts at 182–184° C.

*Example 24*

From 21 g. of allyl 2-phenyl-2-chloroethan-1-oate and 13.4 g. of diethylaminoethanethiol in 100 cc. of acetonitrile are obtained 24 g. of allyl 2-phenyl-2-(2'-diethylaminoethylmercapto)-ethan-1-oate, which boils under 0.009 mm. at 130–132° C. The dihydrogencitrate of the new ester melts at 84–85° C., the N-methylmethosulfate at 120–122° C.

*Example 25*

From 22.2 g. of crotyl 2-phenyl-2-chloroethan-1-oate (produced from the appropriate acid chloride and crotylalcohol, B.P. 12 mm., 160° C.) and 10.5 g. of dimethylaminoethanethiol in 100 cc. of acetonitrile are obtained after the usual working up 23.8 g. of crotyl 2-phenyl-2-(2'-dimethylaminoethylmercapto)-ethan-1-oate boiling under 0.01 mm. at 133–134° C. The new ester forms a hydrochloride which is readily soluble in water, a dihydrogencitrate which melts at 75–76° C. and a N-methylmethosulfate which melts at 155–156° C. The two latter salts are likewise readily soluble in water.

The corresponding diethylaminoethylmercapto compound is produced in analogous manner. It represents a colorless oil, which boils under 0.01 mm. at 141–143° C., a dihydrogencitrate, which melts at 78–80° C. and a N-methylmethosulfate, which melts at 108–109° C.

*Example 26*

23.9 g. of (3'-methyl-buten-2'-yl)-2-phenyl-2-chloroethan-1-oate (produced from the appropriate acid chloride and dimethyl allyl alcohol; B.P. 13 mm., 161° C.) are reacted in the usual manner with 10.6 g. of dimethylaminoethanethiol in 90 cc. of acetonitrile. There are obtained 24.9 g. of dimethyl allyl 2-phenyl-2-(2'-dimethylaminoethylmercapto)-ethan-1-oate boiling under 0.006 mm. at 144–146° C. Its dihydrogencitrate melts at 83–84° C., its N-methylmethosulfate at 165–166° C.

The corresponding diethylaminoethylmercapto compound is produced in analogous manner. It boils under 0.005 mm. at 157–160° C., forms a dihydrogencitrate melting at 82–84° C. and a N-methylmethosulfate melting at 124–125° C.

The piperidinoethylmercapto compound, which boils under 0.004 mm. at 154–155° C., is likewise obtained in analogous manner.

*Example 27*

22.9 g. of methoxyethyl 2-phenyl-2-chloroethan-1-oate (produced from the appropriate acid chloride and methoxyethanol, B.P. 11 mm., 159–161° C.) are mixed with 10.5 g. of dimethylaminoethanethiol in 90 cc. of acetonitrile while stirring. The temperature rises automatically to 45° C. The whole is stirred for 2 hours and then worked up in the usual manner. There result 25.4 g. of methoxyethyl 2-phenyl-2-(2'-dimethylaminoethylmercapto)-ethan-1-oate, which boils under 0.01 mm. at 139–141° C. The dihydrogencitrate, which is readily soluble in water, melts at 60–62° C.

The corresponding diethylaminoethylmercapto compound is produced in analogous manner. It boils under 0.008 mm. at 148–150° C. and forms a dihydrogencitrate which melts at 84–85° C.

*Example 28*

16 g. of methylmercaptoethyl 2-phenyl-2-chloroethan-1-oate (produced from the appropriate acid chloride and methylmercaptoethanol; B.P. 0.006 mm., 120–121° C.) are reacted in the usual manner with 7.4 g. of dimethylaminoethanethiol in 75 cc. of acetonitrile. After working up there are obtained 17.5 g. of methylmercaptoethyl 2-phenyl-2 - (2' - dimethylaminoethylmercapto)-ethan-1-oate, which boils under 0.008 mm. at 153–156° C. The dihydrogencitrate of the new ester melts at 85° C. and is readily soluble in water with weak acid reaction.

The corresponding diethylaminoethylmercapto compound is produced in analogous manner. It boils under 0.01 mm. at 164–166° C. and forms a dihydrogencitrate which melts at 81–83° C.

*Example 29*

35.7 g. of (3',4'-dimethoxybenzyl)-2-phenyl-2-chloroethan-1-oate (produced from the appropriate acid chloride and 3',4'-dimethoxybenzyl-alcohol, B.P. 0.008 mm., 175–178° C.) are reacted with 16 g. of diethylaminoethanethiol in 90 cc. of acetonitrile. Subsequent to the usual working up the raw ester (43.1 g.) is not distilled, but dissolved in 60 cc. of acetone. To this solution are added 20.4 g. of citric acid, the whole heated until dissolved and then filtered. Cooling is followed by treatment with 150 cc. of absolute ether and crystallisation. There are obtained 56.7 g. of dihydrogencitrate of the ester of the formula

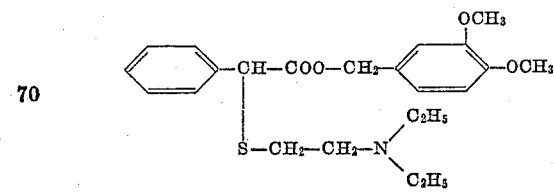

which melts at 78–80° C.

Example 30

26.3 g. of (2'-phenyl-3'-methyl-amyl-1')-2-phenyl-2-chloroethan-1-oate (produced from the appropriate acid chloride and 2'-phenyl-3'-methylamyl alcohol, B.P. 0.01 mm., 159–161° C.) are given into a stirring device with 50 cc. of acetonitrile. A solution of 10.7 g. of diethylaminoethanethiol in 40 cc. of acetonitrile is added dropwise thereto. The temperature rises automatically to 35° C. After two hours follows working up in the usual manner. There are obtained 24 g. of the ester of the formula

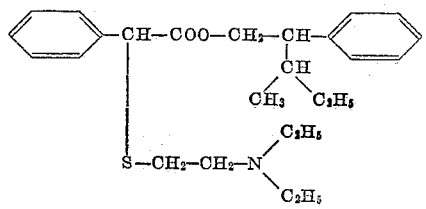

which boils under 0.03 mm. at 200–204° C. The dihydrogencitrate of the new ester melts at 78–80° C. and is readily soluble in water.

Example 31

25 g. of cyclohexyl 2-phenyl-2-chloroethan-1-oate (B.P. 11 mm., 178–180° C.) are reacted in the usual manner with 10.5 g. of dimethylaminoethanethiol. There are obtained 25.1 g. of the ester boiling under 0.01 mm. at 149–152° C. The dihydrogencitrate of the new ester melts at 121–122° C., the N-methylmethosulfate at 179–181° C.

The corresponding diethylaminoethylmercapto compound is produced in analogous manner. It boils under 0.01 mm. at 161–164° C. and forms a readily soluble hydrochloride which dissolves with pH 4 in water, a dihydrogencitrate, which is readily soluble in water and melts at 107–109° C., and a readily soluble N-methylmethosulfate melting at 121–122° C.

In a manner analogous to that described here above can be produced:

(2"-methylcyclohexyl)-2-phenyl-2-(2'-dimethylaminoethylmercapto)-ethan-1-oate; B.P. 0.008 mm., 147–148° C.; methane-sulfonic acid: readily soluble in water; hydrochloride: relatively little soluble in water; dihydrogencitrate: M.P. 85–87° C., readily soluble in water; N-methylmethosulfate: M.P. 185–186° C., readily soluble in water;

(2"-methylcyclohexyl)-2-phenyl-2-(2'-diethylaminoethylmercapto)-ethan-1-oate; B.P. 0.008 mm., 155–157° C.; methane-sulfonic acid: readily soluble in water; hydrochloride: little soluble in water; acetate: readily soluble in water; dihydrogencitrate: M.P. 91–92° C., readily soluble in water; N-methylmethosulfate: M.P. 90–92° C., readily soluble in water.

Example 32

24.8 g. of LiAlH$_4$ in 510 cc. of absolute ether are given into a stirring device provided with dropping funnel and cooler. 125 g. of ethyl 2-phenyl-2-(2'-dimethylaminoethylmercapto)-ethan-1-oate in 730 cc. of absolute ether are added dropwise with stirring in such manner as to have the reaction mixture continue the slight boiling. After 1 hour the reduction is terminated. The whole is treated carefully with a mixture of 220 cc. of dioxane and 52 cc. of water. Subsequent to cooling the aluminium hydroxide is filtered off and washed very well with ether. The ether is evaporated on the water bath, and the residue is dried in vacuo at 30° C. Cooling and scratching with a glass rod is followed by crystallisation. The crystal slurry is dissolved in 730 cc. of hot petroleum ether (B.P. 60–90° C.), and the solution is filtered and cooled. After 24 hours' standing in the refrigerator the crystal slurry is filtered off with suction and washed with low boiling petroleum ether. Subsequent to drying are obtained 72.6 g., corresponding to 62% of the theoretical value, of 2-phenyl-2-(2'-dimethylaminoethylmercapto)-ethanol-(1). The new alcohol forms colorless crystals which melt at 55–56° C. and which are dissolved in most of the solvents as well as in water with strong alkaline reaction. The dihydrogencitrate of the alcohol melts at 108–110° C. and is readily soluble in water and ethanol, but less soluble in acetone.

Example 33

25 g. of the aminoalcohol obtained according to the aforegoing example are combined with 60 cc. of absolute pyridine and 30 cc. of acetic acid anhydride. The whole is set aside for 12 hours, then evaporated in vacuo to dryness, and the residue is taken up in 400 cc. of 0.5 N glycolic acid. The acid aqueous solution is washed once with ether, then rendered alkaline with 350 cc. of 2 N aqueous sodium carbonate solution and extracted with 200 cc. of ether. Drying of the ether is followed by evaporation and distillation of the residue in vacuo. The resulting acetic acid ester distills under 0.01 mm. at 129–133° C. The pure yield is 24.5 g., corresponding to 82.5% of the theoretical value. The dihydrogencitrate of the ester melts at 83–86° C., the N-methylmethosulfate at 123–126° C. Both salts are readily soluble in water.

Example 34

7 g. of the alcohol obtained according to Example 32 and 4.3 g. of ethyl-diisopropylamine are dissolved in 60 cc. of absolute benzene. To this solution is added a solution of 3.5 g. of propanoic acid chloride in 60 cc. of absolute benzene. The whole is set aside for 24 hours and then stirred with 60 cc. of 2 N aqueous sodium carbonate solution. The benzene solution is separated off and extracted four times with 50 cc. each of 2 N glycolic acid. The combined aqueous extracts are rendered alkaline, the separating oil is taken up in ether and then worked up in the usual manner. The propanoate of the alcohol boils under 0.02 mm. at 130–132° C. Its dihydrogencitrate melts at 72–74° C.

In analogous manner are produced the following esters of the 2-phenyl-2-(2'-dimethylaminoethylmercapto)-ethanol-(1):

| Acid radical | Yield, percent | B.P. | M.P. of dihydrogencitrate, ° C. |
|---|---|---|---|
| Butyrate | 82.5 | 0.01 mm.: 137–133° C | 85–88 |
| Pentanoate | 95.0 | 0.006 mm.: 142–146° C | 84–87 |
| Pivalate | 65.7 | 0.01 mm.: 118–121° C | 95–98 |
| Dimethylacroylate | 82.0 | 0.01 mm.: 142–144° C | 83–85 |
| Phenylacetate | 70.0 | 0.005 mm.: 160–162° C | 60–62 |
| 2-phenyl-3-methyl-pentanoate | 89.0 | 0.006 mm.: 184–186° C | 86–88 |
| Benzoate | 93.0 | 0.01 mm.: 174–176° C | 90–93 |
| Nicotinate | 60.0 | 0.009 mm.: 172–176° C | 70–71 |

Example 35

22.6 g. of LiAlH$_4$ in 600 cc. of absolute ether are given into a stirring device provided with dropping funnel and discharge cooler. 124 g. of ethyl 2-phenyl-2-(2'-diethylaminoethylmercapto)-ethan-1-oate in 600 cc. of absolute ether are added dropwise in such manner as to have the mixture remain in continuous slight boiling. After 24 hours follows careful treatment with a mixture of 180 cc. of dioxane and 60 cc. of water. The precipitating aluminium hydroxide is filtered off and washed well with ether. The ether is distilled off, and the residue is fractioned under high vacuum. There are obtained 77 g., corresponding to 71.5% of the theoretical value, of 2-phenyl-2-(2'-diethylaminoethylmercapto)-ethanol-(1), which boils under 0.035 mm. at 128–131° C. The dihydrogencitrate of the alcohol is recrystallized from acetone and melts at 93° C. It is readily soluble in water.

It is possible to produce the following esters of the alcohol described in Example 35 by means of the appropriate acid anhydrides or acid chlorides:

| Acid radical | Yield, percent | B.P. | M.P. of dihydrogencitrate, °C. |
|---|---|---|---|
| Acetate | 88.5 | 0.03 mm.: 125–127° C | 71–72 |
| Propionate | 98.0 | 0.01 mm.: 135–137° C | 79–81 |
| n-Butyrate | 87.0 | 0.03 mm.: 142–146° C | 80–81 |
| n-Pentanoate | 80.0 | 0.03 mm.: 145° C | 90–92 |
| Pivalate | 52.0 | 0.04 mm.: 137–140° C | 82–84 |
| β,β-Dimethylacrylate | 68.5 | 0.03 mm.: 153–157° C | 83–85 [1] 64–67 |
| Phenylacetate | 85.0 | 0.015 mm.: 170–175° C | 103–105 |
| 2-phenyl-3-methyl-pentanoate | 69.0 | 0.01 mm.: 191–194° C | 76–77 |
| Benzoate | 88.0 | 0.9 mm.: 190° C | 86–88 [1] 92–94 |
| nicotinate | 64.0 | 0.06 mm.: 135° C | 68–69 |

[1] N-methylmethosulfate.

Example 36

66.5 g. of 2-phenyl-2-chloro-ethanoic acid chloride and 50 cc. of petroleum ether are given into a stirrer. To this solution are added dropwise while vigorously stirring and with outer ice cooling 100 cc. of ammonium hydroxide solution, which had been diluted with 300 cc. of water. Stirring is continued for 1 hour at 20° C., and the precipitating product is then filtered off with suction. The dried raw amide is recrystallised from hot benzene. There are obtained 47.5 g. of 2-phenyl-2-chloro-ethanoic acid amide (M.P. 116–118° C.).

25 g. of the thus resulting amide are dissolved in 180 cc. of acetonitrile. To this solution are added dropwise 19 g. of dimethylaminoethanethiol in 40 cc. of acetonitrile. When the light reaction subsides, the whole is heated to boiling for 5 hours. After cooling are added 300 cc. of 1.5 N acetic acid and the whole evaporated to dryness. The residue is treated with water, and the aqueous solution is shaken well with ether.

The aqueous phase is then rendered alkaline by means of saturated aqueous potassium carbonate solution, and the separating oil is taken up in chloroform. The chloroform layer is separated, dried and evaporated. The residue is recrystallised from benzene. There result 31.6 g. of 2-phenyl-2-(2'-dimethylaminoethylmercapto)-ethanoic acid amide, which melts at 116–117° C. It is little soluble in water and in petroleum ether, but readily soluble in the usual organic solvents and in dilute acids.

In analogous manner can be produced the diethylaminoethylmercapto compound. It can be recrystallised from a mixture of benzene and petroleum ether and melts at 103–104° C. The new amide is practically insoluble in water and petroleum ether, but well soluble in dilute acids and in the usual organic solvents.

Example 37

In a manner analogous to that described in Example 36 are obtained from 35 g. of 2-phenyl-2-chloro-ethanoic acid-benzylamide (M.P. 94–95° C.) and 14.2 g. of dimethylaminoethanethiol in 270 cc. of acetonitrile after 5 hours' reflux heating 21 g. of 2-phenyl-2-(2'-dimethylaminoethylmercapto)-ethanoic acid benzylamide, which melts at 64–65° C. The citrate of the basic amide melts at 104–106° C. after having been recrystallised from acetonitrile/ether.

The diethylaminoethylmercapto compound, which melts at 73–73.5° C., is obtained in analogous manner in a yield of 91%.

Example 38

When heating 29 g. of 2-phenyl-2-chloro-ethanoic acid ethylamide (M.P. 99–100° C.) with 15.5 g. of dimethylaminoethanethiol in 230 cc. of acetonitrile and working up in the manner described in Example 36, 28.5 g. of 2-phenyl-2-(2'-dimethylaminoethylmercapto)-ethanoic acid ethylamide are obtained. The dihydrogencitrate of the new amide can be produced in acetonitrile by means of citric acid and melts at 87–89° C.

Example 39

When reacting 25 g. of 2-chloro-2-phenyl-ethanoic acid pyrrolidide with 14.2 g. of dimethylaminoethanethiol in 230 cc. of hot acetonitrile and working up in the manner described in Example 36, 17 g. of 2-phenyl-2-(2'-dimethylaminoethylmercapto)-ethanoic acid pyrrolidide are obtained. The new amide can be recrystallised from petroleum ether and melts, thus purified, at 45° C. Its citrate melts at 105–107° C.

Example 40

Heating to boiling of 33.6 g. of 2-phenyl-2-chloroethanoic acid ethylamide with 26.8 g. of diethylaminoethanethiol in 240 cc. of acetonitrile leads to 45 g. of 2-phenyl - 2-(2'-diethylaminoethylmercapto)-ethanoic acid ethylamide. The citrate of the new amide is recrystallised from acetonitrile/isopropanol and melts at 94–95° C.

What I claim is:

1. A compound selected from the group consisting of an ester of a 2-aryl-2-aminoalkylmercapto-ethanoic acid, its pharmaceutically acceptable acid addition salts and its pharmacutically acceptable N-lower alkyl quaternary salts, and its pharmaceutically acceptable N-lower alkenyl quaternary salts, said ester being of the formula:

$$R_1\text{-}C_6H_3(R_2)\text{-}CH(S\text{-}R_3\text{-}Am)\text{-}COOR$$

wherein $R_1$ and $R_2$ are members of the class consisting of hydrogen, chlorine, bromine, alkyl, alkylmercapto and together methylenedioxy, whereby $R_1$ and $R_2$ contain together not more than 4 carbon atoms, $R_3$ is alkylene from 2 to 4 carbon atoms, Am is a member of the class consisting of lower monoalkylamino, di-lower alkylamino, pyrrolidino, piperidino, morpholino and N'-lower alkylpiperazino, and R is a member of the class consisting of alkyl, alkenyl, alkanedienyl, alkynyl, alkanediynyl, cycloalkyl, cycloalkylalkyl and aralkyl containing not more than 12 carbon atoms.

2. A compound of the formula $$C_6H_5\text{-}CH(S\text{-}C_2H_4\text{-}N(\text{lower alkyl})_2)\text{-}COO\text{-}C_2H_5$$

3. A compound of the formula $$C_6H_5\text{-}CH(S\text{-}C_2H_4\text{-}N(\text{lower alkyl})_2)\text{-}COO\text{-}C_3H_7$$

4. A compound of the formula $$C_6H_5\text{-}CH(S\text{-}C_2H_4\text{-}N(\text{lower alkyl})_2)\text{-}COO\text{-}C_4H_9$$

5. A compound of the formula $$C_6H_5\text{-}CH(S\text{-}C_2H_4\text{-}N(\text{lower alkyl})_2)\text{-}COO\text{-}C_5H_{11}$$

6. A compound of the formula $$C_6H_5\text{-}CH(S\text{-}CH_2\text{-}CH_2\text{-}N(C_2H_5)_2)\text{-}COOC_2H_5$$

7. A compound of the formula
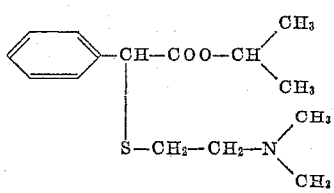
8. A compound of the formula
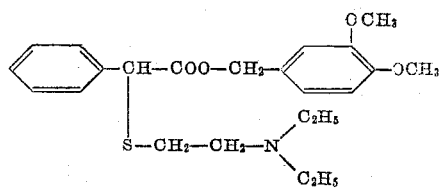
No references cited.